United States Patent [19]

Bertsch

[11] Patent Number: 4,471,812
[45] Date of Patent: Sep. 18, 1984

[54] REMOTE RELIEF-VENT DEVICE

[76] Inventor: Paul Bertsch, 14921 Riata, Midway City, Calif. 92655

[21] Appl. No.: 353,805

[22] Filed: Mar. 1, 1982

[51] Int. Cl.³ .......................................... F16K 15/14
[52] U.S. Cl. .................................. 137/855; 137/527.6
[58] Field of Search ............... 137/855, 856, 857, 858, 137/454.4, 454.5, 527.6

[56] References Cited

U.S. PATENT DOCUMENTS

| 69,763 | 10/1867 | Cady | 137/858 |
|---|---|---|---|
| 2,563,200 | 8/1951 | Venning | 137/855 X |
| 2,894,528 | 7/1959 | Sykes | 137/855 X |
| 3,807,430 | 4/1974 | Keller | 137/855 X |
| 4,015,624 | 4/1977 | Wanstreet | 137/855 X |

FOREIGN PATENT DOCUMENTS

| 820354 | 11/1951 | Fed. Rep. of Germany | 137/855 |
|---|---|---|---|
| 672884 | 5/1952 | United Kingdom | 137/855 |

Primary Examiner—Robert G. Nilson
Attorney, Agent, or Firm—Francis X. LoJacono

[57] ABSTRACT

A relief-vent device to be employed in combination with pressure-release valves associated with high-pressure gas-storage tanks, such as LPG storage tanks that are mounted to vehicles for which such gas is employed as a means for fuel. The vent device is normally required to be located remotely from the storage tank, and to be mounted for vertical discharge or at an angle not exceeding 45° thereto, the vent body being formed having an annular recess to receive a flexible vent cover that is secured along one edge thereof within the recess, whereby the outlet formed in the body is closed so as to be sealed until gas is released from the tank for discharge to the atmosphere.

4 Claims, 3 Drawing Figures

U.S. Patent  Sep. 18, 1984  4,471,812
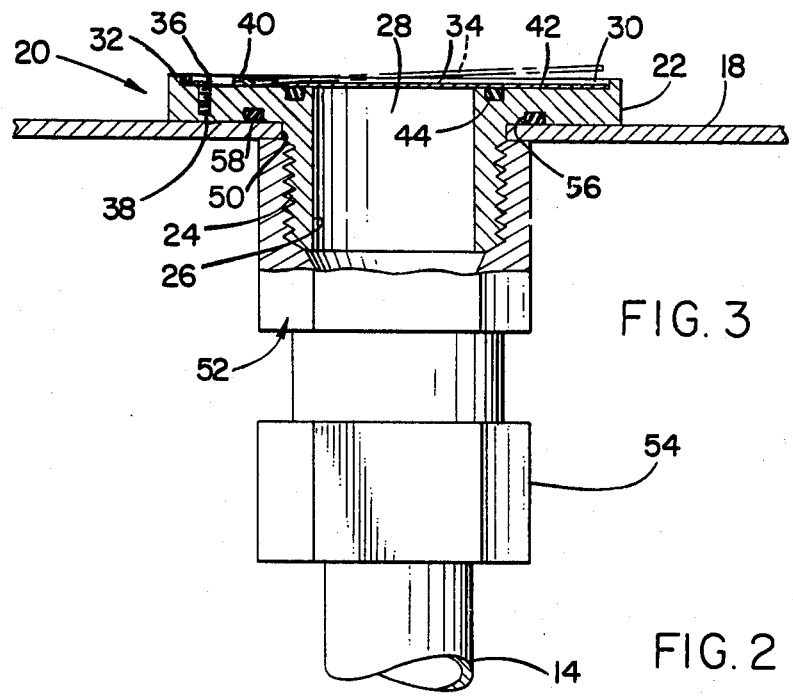
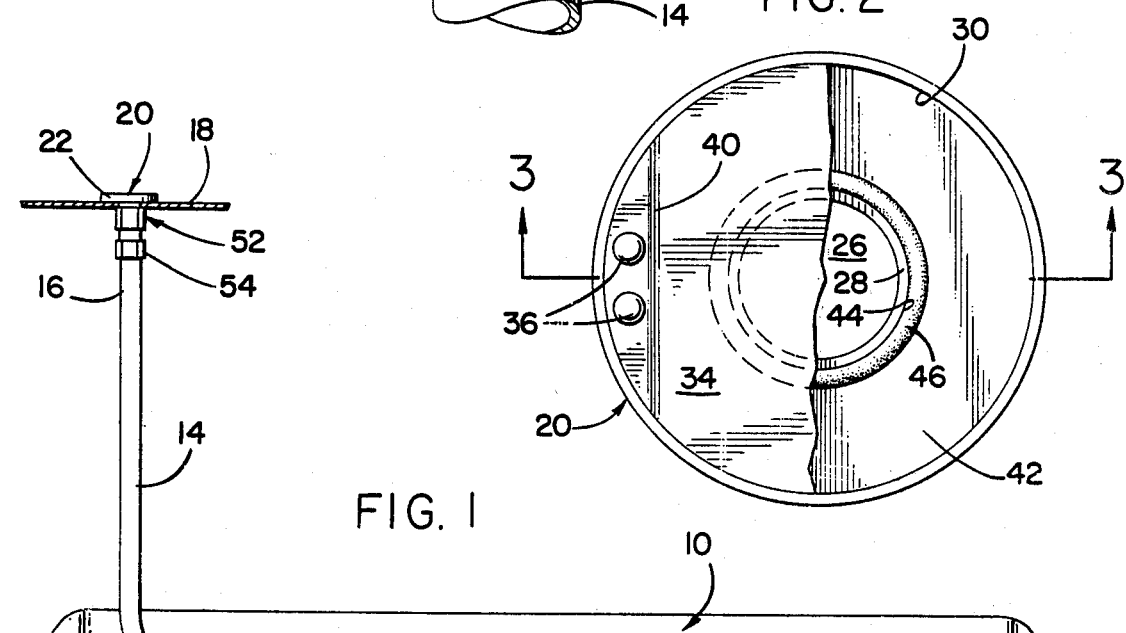
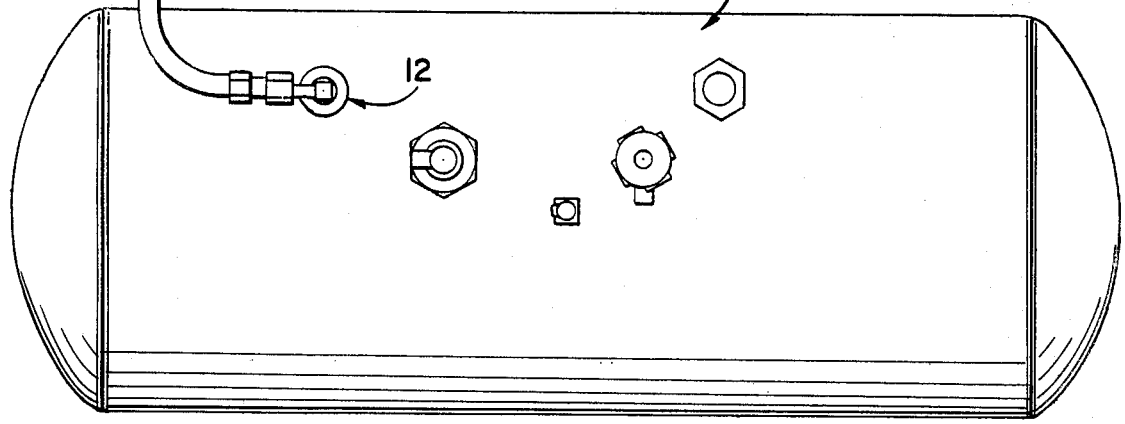

REMOTE RELIEF-VENT DEVICE

BACKGROUND OF THE INVENTION

1. Field of the Invention

This invention relates to a vent device for the release of gas, and more particularly to a relief vent that operates in conjunction with a pressure-relief valve associated with high-pressure, gas-storage tanks.

2. Description of the Prior Art

It is well known in the art that various problems and difficulties are being encountered in providing suitable venting means associated with high-pressure storage tanks, particularly where the tanks are mounted to vehicles and are adapted to store the LPG-type of fuel for vehicles.

The principal problem is in protecting the venting system so that the overflow of gas can be released in a simple yet safe manner, and foreign matter is prevented from entering the discharge line of the system. Many types of vents have been tried, and those that are presently being employed have not been entirely satisfactory for use with LPG-fuel systems. That is, most of the vents are very complicated, and they are costly to install and maintain. Furthermore, over a period of time, they are very often adversely affected by the environment and become inefficient or inoperable—thus allowing water, dirt and other foreign matter or objects to become lodged in the main overflow-discharge line.

It should be noted that, for safety reasons, it is required that a pressure-regulating valve be installed with a storage tank, whereby gas pressure within the tank is maintained at a safe level. However, when a vent is installed in a vehicle, it is also required that it be located outside of the vehicle body and be pointed in a vertical direction, or at the most 45° thereto, so that any gases released will be readily discharged to atmosphere and thus not be dangerously entrapped within or under the vehicle.

Therefore, it can be seen that it is highly desirable to be able to provide a reliable vent device having a simple operation and capable of being mounted vertically.

SUMMARY OF THE INVENTION

The present invention has for an important object a provision whereby a venting device is structured so as to overcome all of the above-mentioned problems, and further is operated at pressures as low as two pounds per square inch, without the need for adjustments of any kind.

It is another object of the invention to provide a relief-vent device that is particularly adapted for use in a vertical position, remotely from the pressure-relief valve which is attached to the storage tank.

It is still another object of the invention to provide a relief-vent device that comprises a body member having an annular recess adapted to receive a flexible flap cover, wherein the flap cover is sealed so as to close over the discharge passage of the vent line until an overflow of gas is discharged from the tank, at which time the gas will cause the biased cover to lift—allowing the gas to escape to atmosphere outside the perimeter of the vehicle.

It is a further object of the invention to provide a remote-relief-vent device of this type that has few operating parts, and that is easy to install, service and maintain.

Still another object of the invention is to provide a device of this character that is relatively inexpensive to manufacture, and is simple yet rugged in construction, so as to establish a long operating life.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 1 is a diagrammatic view of the present invention attached to an overflow system connected to a high-pressure liquid-gas tank;

FIG. 2 is an enlarged top-plan view of the relief-vent device having a portion of the closure cover broken away; and FIG. 3 is a cross-sectional view taken substantially along line 3—3 of FIG. 2.

DESCRIPTION OF THE PREFERRED EMBODIMENT

Referring more particularly to FIG. 1, there is diagrammatically illustrated a high-pressure gas-storage tank, generally indicated at 10, which is adapted to dispense liquified petroleum (LPG).

The unit as shown is further adapted for use with vehicles that operate using LPG as fuel, in which case the storage tank together with the necessary components are mounted to the vehicle, and must include a pressure-relief valve, indicated by numeral 12.

Thus, when pressure within the tank rises above a given level, the pressure-relief valve automatically vents gas to the atmosphere. However, since most of the tanks are mounted under a vehicle or sometimes in the trunk of an automobile, a vent line 14 is employed to carry the overflow gas to the outside perimeter of the vehicle.

In order to provide for the complete discharge of the overflow gas, the vent line 14 should be positioned preferably vertical, or not exceeding a 45° angle thereto. The terminating end 16 of vent line 14 is then located adjacent the vehicle body 18, whereby a protective device is required to prevent rain, dirt and other foreign matter from entering and clogging line 16.

Accordingly, the present invention herein disclosed provides a simple and unique means of allowing the overflow gases to escape to the exterior of a vehicle, and yet preventing entry to the line when it is in a closed mode.

The invention comprises a gas-relief-vent device, generally designated at 20, which is adapted to be secured to the terminating end of line 14, as seen both in FIG. 1 and FIG. 3. The relief vent is formed having an annular and substantially flat body member 22 with an extended threaded nipple member 24.

A central passage or conduit 26 is provided wherein the upper discharge end 28 terminates in an annular recess or cavity 30. Cavity 30 is defined by a peripheral lip member 32, the cavity being adapted to receive a flow-control gas-release means. The gas-release means is secured within cavity 30, and it comprises a flexibly biased and substantially flat closure shield or cover 34. The shield or cover may be secured by any suitable means, but it is herein shown secured in recess 30 by a pair of pins 36, which are threaded into position or force-pressed into bores 38.

A biasing means is also provided to cause shield 34 to lay flat across the discharge end 28 of passage 26, the biasing means being defined by transverse bend 40 formed in the shield adjacent the securing pins 36. Hence, when a volume of gas is released through relief valve 12, gas flows through line 14 and passes into passage 26, thus forcing shield 30 to bend upwardly against the downwardly biasing effect of bend 40. It should be noted that as little as two pounds of pressure is all that is required to lift the shield so as to allow the gas to discharge therefrom.

In order to establish a more positive seal during the closure of passage 26, there is also provided a sealing means disposed between the shield 34 and the surface 42 of cavity 30. The sealing means comprises an annular channel 44 formed around the discharge end of passage 26 having an "O" ring member 46 positioned therein. This sealing means allows for a more gentle and even release of gas, so as not to cause the thin shield to vibrate, the shield 34 having a thickness of approximately 0.005 of an inch.

A hole 50 is formed in the vehicle body 18 at the desired location, threaded nipple 24 being received therethrough and then being attached to a suitable pipe reducer 52. The pipe reducer acts as a means to secure the relief vent to body 18 at a remote location from relief valve 12. Accordingly, line 14 is provided with a typical connector 54 which is attached to pipe reducer 52, in a manner well known in the art.

A second sealing means is provided between the bottom surface of vent body 22 and the vehicle body 18, the sealing means comprising an annular channel 56 adapted to receive an "O" ring member 58. Thus, as reducer 52 is tightened on nipple 24, "O" ring 58 sealingly engages vehicle body 18, as illustrated in the cross-sectional view of FIG. 3.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. A relief-vent device adapted to vent discharged gas released from a remote high-pressure-relief valve associated with a storage tank holding liquified petroleum gas, said relief-vent device comprising:
   a vent-body member having an annular and substantially flat-surfaced cavity formed therein;
   an integrally formed depending nipple member, wherein said nipple member includes external threads whereby said relief vent can be secured to a fixed structure in a vertical position, or not exceeding a 45° angle from said vertical position, in order to allow the free discharge of gas;
   a central-discharge passage formed in said vent body and nipple member, the discharge end thereof terminating in said cavity;
   a flexible shield adapted to be movably secured in said cavity and disposed over said central passage, whereby said passage is covered when gas is not being released from said relief valve;
   means for securing said shield along a given edge thereof, in order to allow said shield to flex to an open discharge position as gas is released from said relief valve;
   a biasing means formed in said flexible shield,
   wherein said biasing means comprises a bend formed transversely in said shield and adjacent said shield-securing means;
   a first sealing means interposed between said flat surface of said cavity and said flexible shield; and
   wherein said vent body includes:
   a substantially flat bottom surface;
   a second sealing means formed in said flat bottom surface, whereby said second sealing means is interposed between said vent body and said fixed structure; and
   means for securing said vent body to said fixed structure.

2. A relief-vent device as recited in claim 1, wherein said first sealing means comprises:
   an annular channel disposed about said discharge end of said passage; and
   an "O" ring adapted to be positioned in said annular channel.

3. A relief-vent device as recited in claim 2, wherein said second sealing means comprises:
   an annular channel disposed in said bottom surface of said vent body; and
   an "O" ring member adapted to be positioned in said annular channel.

4. A relief-vent device as recited in claim 3, wherein said vent-body-securing means comprises a pipe reducer adapted to be threaded to said nipple member.

* * * * *